(12) United States Patent
Inoue

(10) Patent No.: US 6,217,445 B1
(45) Date of Patent: Apr. 17, 2001

(54) DRIVING GAME MACHINE AND COMPUTER-READABLE MEDIUM STORING DRIVING GAME PROGRAM

(75) Inventor: Yoshihisa Inoue, Tatsuno (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 08/803,099

(22) Filed: Feb. 20, 1997

(30) Foreign Application Priority Data

Jun. 7, 1996 (JP) .................................................. 8-146189

(51) Int. Cl.⁷ ....................................................... A63F 13/00
(52) U.S. Cl. ............................................................... 463/6
(58) Field of Search .................................. 463/6, 58, 59, 463/60, 62; 434/61, 62, 63, 64, 68, 69, 307 R; 273/459, 460, 461, 246; 345/418, 419

(56) References Cited

U.S. PATENT DOCUMENTS

| | | | |
|---|---|---|---|
| 3,608,210 | * | 9/1971 | O'Shea .................................... 434/68 |
| 4,174,833 | * | 11/1979 | Hennig et al. .......................... 434/63 |
| 5,146,557 | * | 9/1992 | Yamrom et al. ...................... 395/161 |
| 5,184,956 | * | 2/1993 | Langlais et al. ....................... 434/62 |
| 5,228,119 | * | 7/1993 | Mihalisin et al. .................... 395/118 |
| 5,269,687 | * | 12/1993 | Mott et al. ............................... 463/6 |
| 5,299,810 | | 4/1994 | Pierce et al. . |
| 5,415,550 | * | 5/1995 | Aoki et al. ............................. 434/61 |
| 5,428,715 | * | 6/1995 | Suzuki .................................. 395/119 |
| 5,474,453 | | 12/1995 | Copperman . |
| 5,566,279 | * | 10/1996 | Katayama ............................ 395/119 |
| 5,798,761 | * | 8/1998 | Isaacs ................................... 345/419 |
| 5,821,925 | * | 10/1998 | Carey et al. .......................... 345/331 |
| 5,821,943 | * | 10/1998 | Shashua ................................ 345/427 |
| 5,877,768 | * | 3/1999 | Jain ...................................... 345/421 |

FOREIGN PATENT DOCUMENTS

| | | |
|---|---|---|
| 0579451 | 1/1994 | (EP) . |
| 4-243291 | 8/1992 | (JP) . |
| 7-116355 | 5/1995 | (JP) . |

OTHER PUBLICATIONS

Kuhl J: "The Iowa Driving Simulator: and Immersive Research Environment" Computer, vol. 28, No. 7, Jul. 1, 1995.

Database WPI, Section PQ, Week 9628, Derwent Publications Ltd., London, GB; AN 96–276219, XP002058753, & TW 273 519 (Konami Co Ltd), Apr. 1, 1996.

Patent Abstracts of Japan, vol. 015, No. 445 (C–0884), Nov. 13, 1991 & JP 03 188885 A (Taito Corp), Aug. 16, 1991.

* cited by examiner

Primary Examiner—Valencia Martin-Wallace
Assistant Examiner—John Paradiso
(74) Attorney, Agent, or Firm—Jordan and Hamburg LLP

(57) ABSTRACT

A driving game machine includes an image display processor for displaying on a display monitor a real-time three-dimensional image including a simulated player's automobile, general automobiles, and a three-dimensional road established in a game space in a three-dimensional coordinate system. The three-dimensional road has a running lane and an oncoming lane for the player's and general automobiles to run therealong. The player of the driving game machine operates a driving control assembly including a steering wheel, an accelerator pedal, a brake pedal, and a gear change lever to instruct the player's automobile to run on the three-dimensional road. A player's automobile control unit controls the player's automobile to run on the three-dimensional road in response to instructions from the driving control assembly. The image display processor displays general automobiles on the running lane and the oncoming lane within a visible range of the player's automobile.

14 Claims, 9 Drawing Sheets

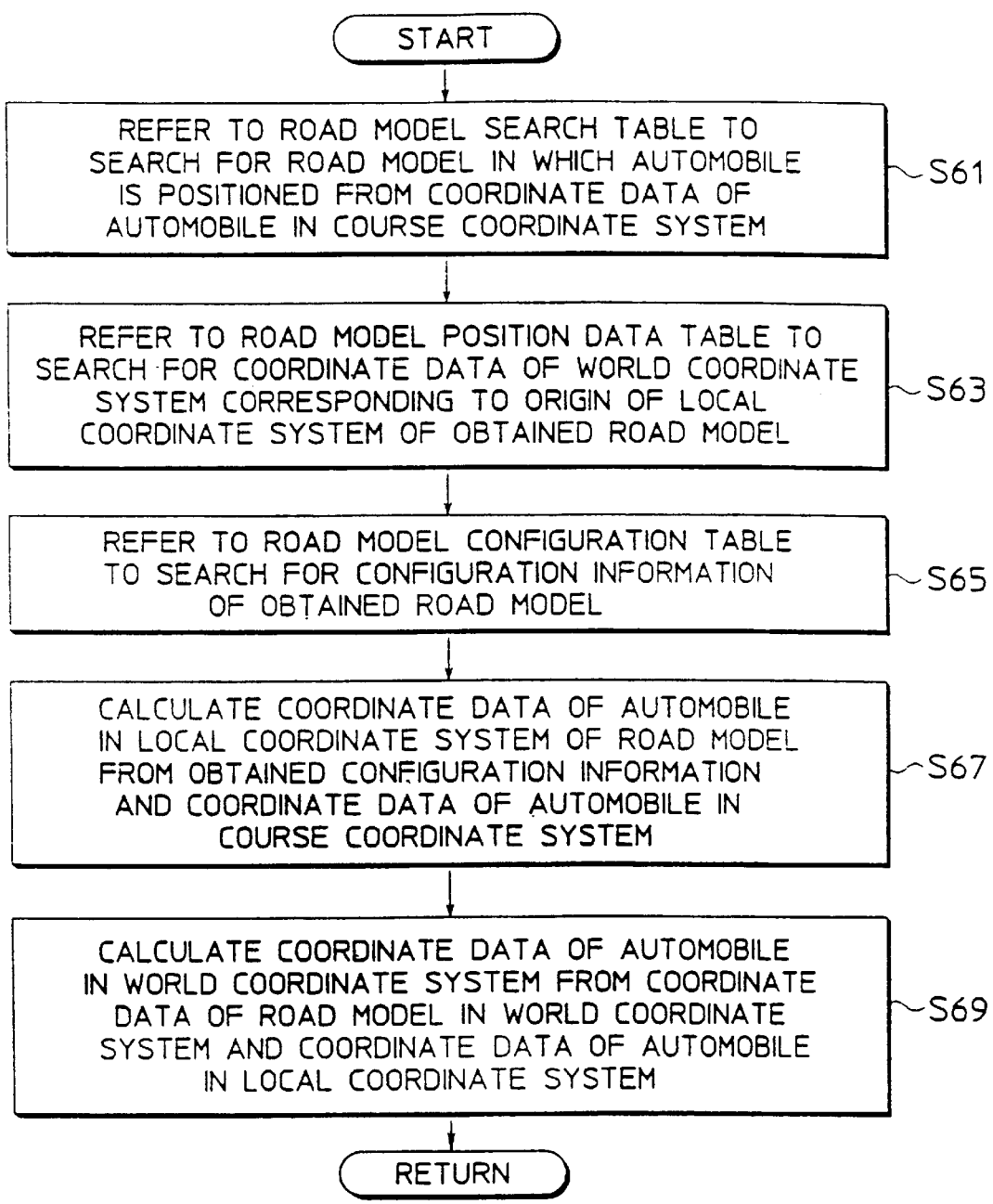

DRIVING GAME MACHINE AND COMPUTER-READABLE MEDIUM STORING DRIVING GAME PROGRAM

BACKGROUND OF THE INVENTION

1. Field of the Invention

The present invention relates to a driving game machine which is played by the player to simulate the driving of an automobile and which displays on a display monitor a real-time three-dimensional image that varies depending on the manner in which the simulated automobile is driven by the player, and a computer-readable medium which stores a driving game program for operating such a driving game machine.

2. Description of the Related Art

There have been in widespread use driving game machines that are played by the player who is seated in a cockpit equipped with a steering wheel, an accelerator pedal, a brake pedal, etc., similar to the driver's seat of an actual automobile. While seeing a three-dimensional image displayed on a display monitor, the player operates the steering wheel, the accelerator pedal, the brake pedal, etc. to drive a simulated automobile on the display monitor. The display monitor displays, on a displayed road, the automobile driven by the player, a rival automobile or automobiles competing for a driving game, and general automobiles existing as obstacles. The automobile driven by the player will be referred to as the player's automobile, and the rival and general automobiles as other automobiles. The player enjoys the driving game by driving the player's automobile at high speeds and passing other automobiles on a three-dimensional road that has bends and uphill and down-hill grades.

With the conventional driving game machines, the displayed three-dimensional road has no oncoming lanes, and the player maneuvers the player's automobile to pass other automobiles running on one or more lanes in the same direction as the player's automobile.

Heretofore, there have been in use driving game machines which two-dimensionally display on a display monitor player's and other automobiles which are running on a displayed road. Even if the displayed road has oncoming lanes, general automobiles running on such oncoming lanes simply appear from an end of the screen of the display monitor, and do not make the driving games played on the driving game machines attractive and interesting to the player.

SUMMARY OF THE INVENTION

It is therefore an object of the present invention to provide a driving game machine for playing a driving game to control a player's automobile running on a displayed three-dimensional road that includes oncoming lanes.

Another object of the present invention is to provide a computer-readable medium which stores a driving game program for operating a driving game machine to play a driving game to control a player's automobile running on a displayed three-dimensional road that includes oncoming lanes.

According to the present invention, there is provided a driving game machine comprising image display processing means for displaying a real-time three-dimensional image including a simulated player's automobile, general automobiles, and a three-dimensional road established in a game space in a three-dimensional coordinate system on a display monitor, the three-dimensional road having a running lane and an oncoming lane for the player's and general automobiles to run therealong, driving control means operable by a player for instructing the player's automobile to run on the three-dimensional road, and player's automobile control means for controlling the player's automobile to run on the three-dimensional road in response to instructions from the driving control means, the image display processing means comprising means for displaying general automobiles on the running lane and the oncoming lane within a visible range of the player's automobile.

In the above driving game machine, general automobiles run on the running and oncoming lanes of the three-dimensional road established in the game space in the three-dimensional coordinate system, and the player's automobile runs on the running lane or the oncoming lane in response to instructions from the driving control means. The image display processing means displays general automobiles on the running lane and the oncoming lane within the visible range of the player's automobile. The player of the driving game machine tries to maneuver the player's automobile to run on the running lane or the oncoming lane in order to avoid a collision with the general automobiles. Therefore, the player finds it interesting and much fun to drive the player's automobile on the display monitor.

The image display processing means displays general automobiles to run in the running lane in the same direction as the player's automobile and general automobiles to run in the oncoming lane in a direction opposite to the player's automobile. The player drives the player's automobile to pass general automobiles on the running lane while avoiding colliding with general automobiles on the oncoming lane. The driving game thus gives a lot of fun to the player.

The driving game machine further includes three-dimensional data memory means for storing coordinate data of the three-dimensional road, two-dimensional data memory means for storing coordinate data of a straight road established in a two-dimensional coordinate system in association with the three-dimensional road, the straight road having a running lane and an oncoming lane for the player's and general automobiles to run therealong, general automobile control means for controlling general automobiles on the running and oncoming lanes of the straight road, two-dimensional coordinate transforming means for transforming coordinate data of the player's automobile on the three-dimensional road into coordinate data on the straight road in the two-dimensional coordinate system, position deciding means for determining general automobiles positioned in the visible range of the player's automobile based on the coordinate data on the straight road in the two-dimensional coordinate system, and three-dimensional coordinate transforming means for transforming coordinate data of the general automobiles which are determined as being positioned in the visible range into coordinate data on the three-dimensional road in the three-dimensional coordinate system.

With the above arrangement, the player's automobile runs on the running and oncoming lanes of the three-dimensional road established in the game space in the three-dimensional coordinate system in response to instructions from the driving control means. Coordinate data of the player's automobile on the three-dimensional road are transformed into coordinate data on the straight road in the two-dimensional coordinate system. Using the coordinate data on the straight road in the two-dimensional coordinate system, those general automobiles which are positioned in the visible range of the player's automobile are determined among the general automobiles running on the running and oncoming lanes of the straight road. The coordinate data of the determined general automobiles are converted into coordinate data on the three-dimensional road in the three-dimensional coordinate system, and displayed on the display monitor. The positional relationship between the player's and general automobiles can quickly and easily be determined using the coordinate data on the straight road in the two-dimensional coordinate system.

The driving game machine also includes lane selecting means for selecting a left-side lane or a right-side lane for use as the three-dimensional road, and coordinate switching means for switching between coordinate data of the running and oncoming lanes transversely across the straight road, which are stored in the two-dimensional data memory means, depending on the selected left-side or right-side lane.

When the left-side or right-side lane is selected for use as the three-dimensional road, coordinate data of the running and oncoming lanes transversely across the straight road, which are stored in the two-dimensional data memory means, are switched depending on the selected left-side or right-side lane. For example, when the right-side lane is selected, coordinate data of the running lane transversely across the straight road, which has been set as the left-side lane, are changed to the oncoming lane. The driving game machine can thus easily be adapted to the left-side or right-side lane.

The driving game machine further includes counting means for counting general automobiles positioned within a predetermined range from the player's automobile based on the coordinate data on the straight road in the two-dimensional coordinate system, the general automobile control means comprising means for introducing a new general automobile into the predetermined range when the number of counted general automobiles is equal to or less than a predetermined value.

Using the coordinate data on the straight road in the two-dimensional coordinate system, general automobiles positioned within the predetermined range from the player's automobile are counted. When the number of counted general automobiles is equal to or less than the predetermined value, a new general automobile is introduced into the predetermined range from the player's automobile. Consequently, general automobiles are introduced at a constant frequency, making the difficulty of the driving game uniform from the beginning to end of the driving game.

The predetermined value to be compared with the number of counted general automobiles may be varied to change the frequency at which general automobiles are introduced for thereby changing the difficulty of the driving game.

The driving game machine further includes rival automobile control means for controlling a rival automobile to run on the three-dimensional road, the two-dimensional coordinate transforming means comprising means for transforming coordinate data of the rival automobile on the three-dimensional road into coordinate data on the straight road in the two-dimensional coordinate system, the position deciding means comprising means for determining whether the rival automobile is positioned within the visible range based on the coordinate data on the straight road in the two-dimensional coordinate system.

The rival automobile control means controls a rival automobile to run on the three-dimensional road. Coordinate data of the rival automobile on the three-dimensional road are transformed into coordinate data on the straight road in the two-dimensional coordinate system. Using the coordinate data on the straight road in the two-dimensional coordinate system, it is determined whether the rival automobile and general automobiles are positioned within the visible range based on the coordinate data on the straight road in the two-dimensional coordinate system. Coordinate data of the rival automobile and general automobiles that have been determined as being positioned within the visible range are transformed into coordinate data on the three-dimensional road in the three-dimensional coordinate system, and then displayed on the display monitor. The player can therefore control the player's automobile to compete with the rival automobile, and finds the driving game highly exciting and interesting.

The rival automobile control means may control the rival automobile to run as instructed by second driving control means operated by another player. This arrangement allows the player of the driving control means and the player of the second driving control means to compete with each other. Since the players can try to drive their automobiles in competition with each other, they will find the driving game much fun.

According to the present invention, there is also provided a computer-readable medium storing a driving game program for driving a simulated player's automobile on a three-dimensional road established in a game space in a three-dimensional coordinate system as instructed by a game player, the three-dimensional road having a running lane and an oncoming lane for the player's automobile and general automobiles to run therealong, the driving game program including the step of displaying on a display monitor a real-time three-dimensional image, which includes general automobiles on the running lane and the oncoming lane, within a visible range of the player's automobile.

According to the computer-readable medium storing the driving game program, general automobiles run on the running and oncoming lanes of the three-dimensional road established in the game space in the three-dimensional coordinate system, and the player's automobile runs on the running lane or the oncoming lane as instructed by the game player. The three-dimensional image including general automobiles on the running lane and the oncoming lane, within a visible range of the player's automobile, is displayed on the display monitor. The game player controls the player's automobile to run on the running or oncoming lane while trying to avoid a collision with general automobile. The player can thus find the driving game exciting and interesting.

The step of displaying the real-time three-dimensional image on the display monitor may comprise the step of transforming coordinate data of the player's automobile on the three-dimensional road in the three-dimensional coordinate system into coordinate data on a straight road in a two-dimensional coordinate system, the step of determining a general automobile positioned in the visible range of the player's automobile based on the coordinate data on the straight road in the two-dimensional coordinate system, and the step of transforming coordinate data of the determined general automobile into coordinate data on the three-dimensional road in the three-dimensional coordinate system. With this arrangement, the player's automobile runs on the running and oncoming lanes of the three-dimensional road established in the game space in the three-dimensional coordinate system in response to instructions from the driving control means. Coordinate data of the player's automobile on the three-dimensional road are transformed into coordinate data on the straight road in the two-dimensional coordinate system. Using the coordinate data on the straight road in the two-dimensional coordinate system, those general automobiles which are positioned in the visible range of the player's automobile are determined among the general automobiles running on the running and oncoming lanes of the straight road. The coordinate data of the determined general automobiles are converted into coordinate data on the three-dimensional road in the three-dimensional coordinate system, and displayed on the display monitor. The positional relationship between the player's and general automobiles can quickly and easily be determined using the coordinate data on the straight road in the two-dimensional coordinate system.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 9 is a flowchart of a positional data transformation subroutine in the operation sequence shown in FIG. 7.

DETAILED DESCRIPTION OF THE PREFERRED EMBODIMENT

Figure 1:
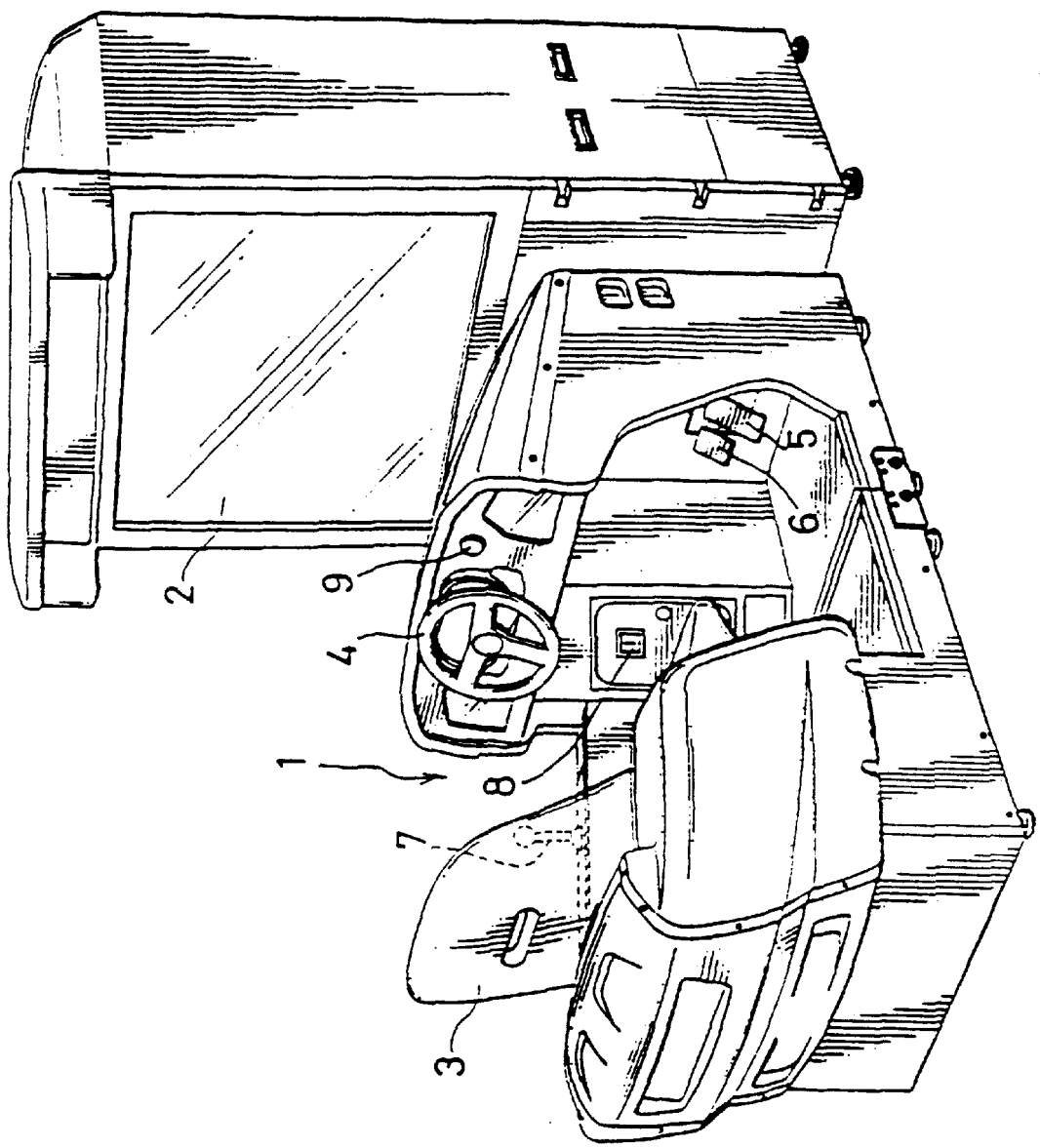
FIG. 1 is a perspective view of a driving game machine according to the present invention.

As shown in FIG. 1, a driving game machine according to the present invention generally comprises a cockpit 1 and a display monitor 2. The cockpit 1 has a driver's seat 3, a steering wheel 4, an accelerator pedal 5, a brake pedal 6, and a gear change lever 7, similar to the A driver's seat of an actual automobile. The cockpit 1 also has a coin insertion slot 8 for inserting a coin therethrough, positioned in front of the left-hand side of the driver's seat 3, and a start switch 9 positioned on the right-hand side of the steering wheel 4. The display monitor 2 is located in front of the cockpit 1 at a position that can easily be viewed by the player who is seated on the driver's seat 3. The display monitor 2 may comprise a CRT (cathode-ray tube), an LCD (liquid crystal display), a projector, or the like for displaying images thereon.

Coordinate systems used in an image processing process for a driving game played on the driving game machine and a summary of such a driving game will be described below with reference to FIGS. 2 through 4.

Figure 2:
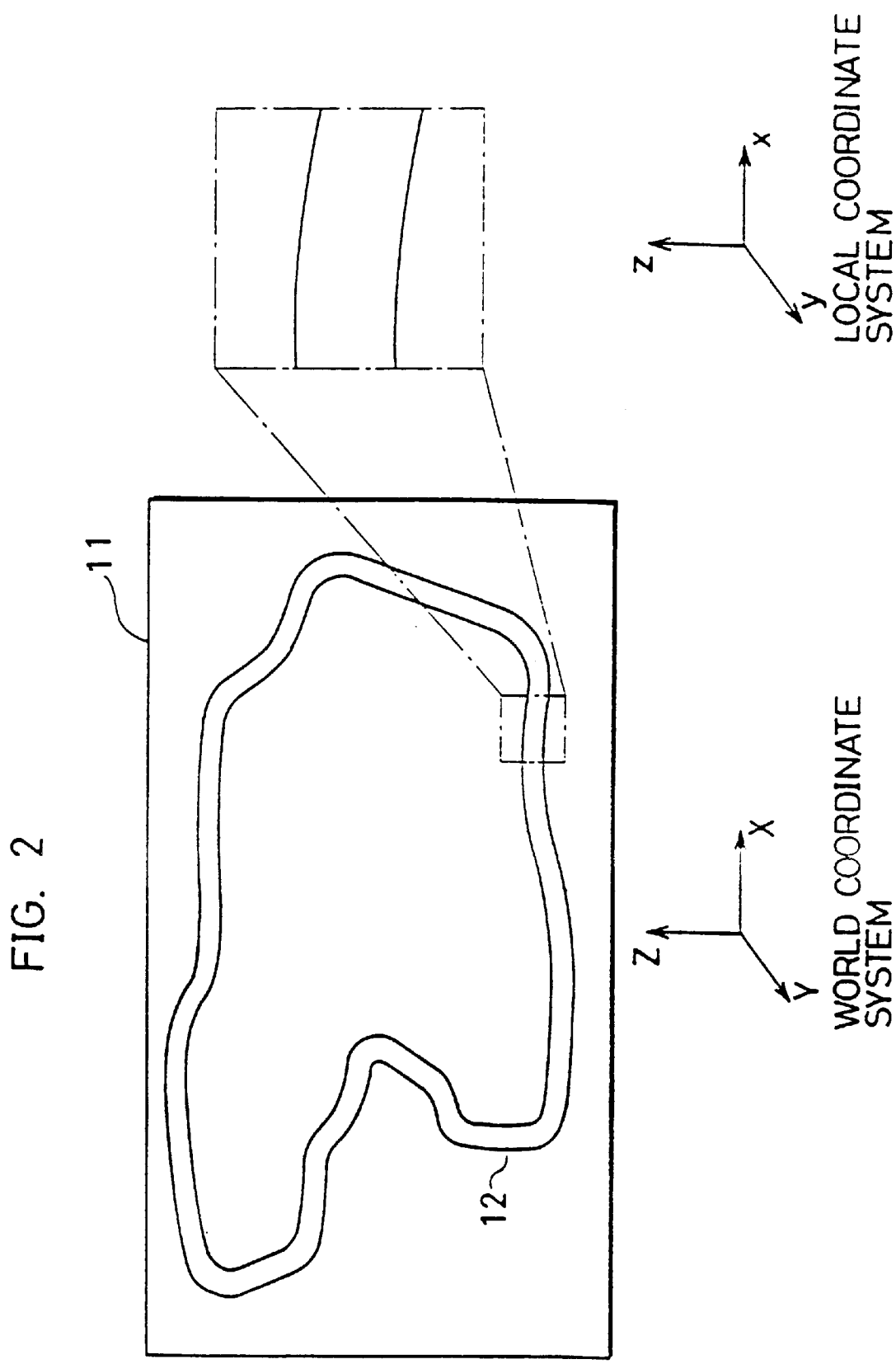
FIG. 2 is a diagram showing a field of a driving game played on the driving game machine.

FIG. 2 schematically shows a field 11 of a driving game played on the driving game machine. The field 11 shown in FIG. 2 represents an entire space that is expressed by a computer graphic image, and includes a circuit road 12 extending substantially along peripheral edges of the field 11 and models (not shown) of buildings and other objects placed along the circuit road 12. FIG. 3 fragmentarily shows the circuit road 12. As shown in FIG. 3, the circuit road 12 has a start point and is divided into road models (1), (2), . . . , (18), (19), . . . spaced by respective distances from the start point. Each of the road models (1), (2), . . . , (18), (19), . . . is an individual object that is displayed as a computer graphic image.

FIG. 2 also shows a three-dimensional world coordinate system (X, Y, Z) which is established in the field 11 in its entirety, and a three-dimensional local coordinate system (x, y, z) which is established in a partial space in the field 11. Each of the road models (1), (2), . . . , (18), (19), . . . and the models of buildings and other objects is described using its own inherent local coordinate system (x, y, z).

Figure 4:
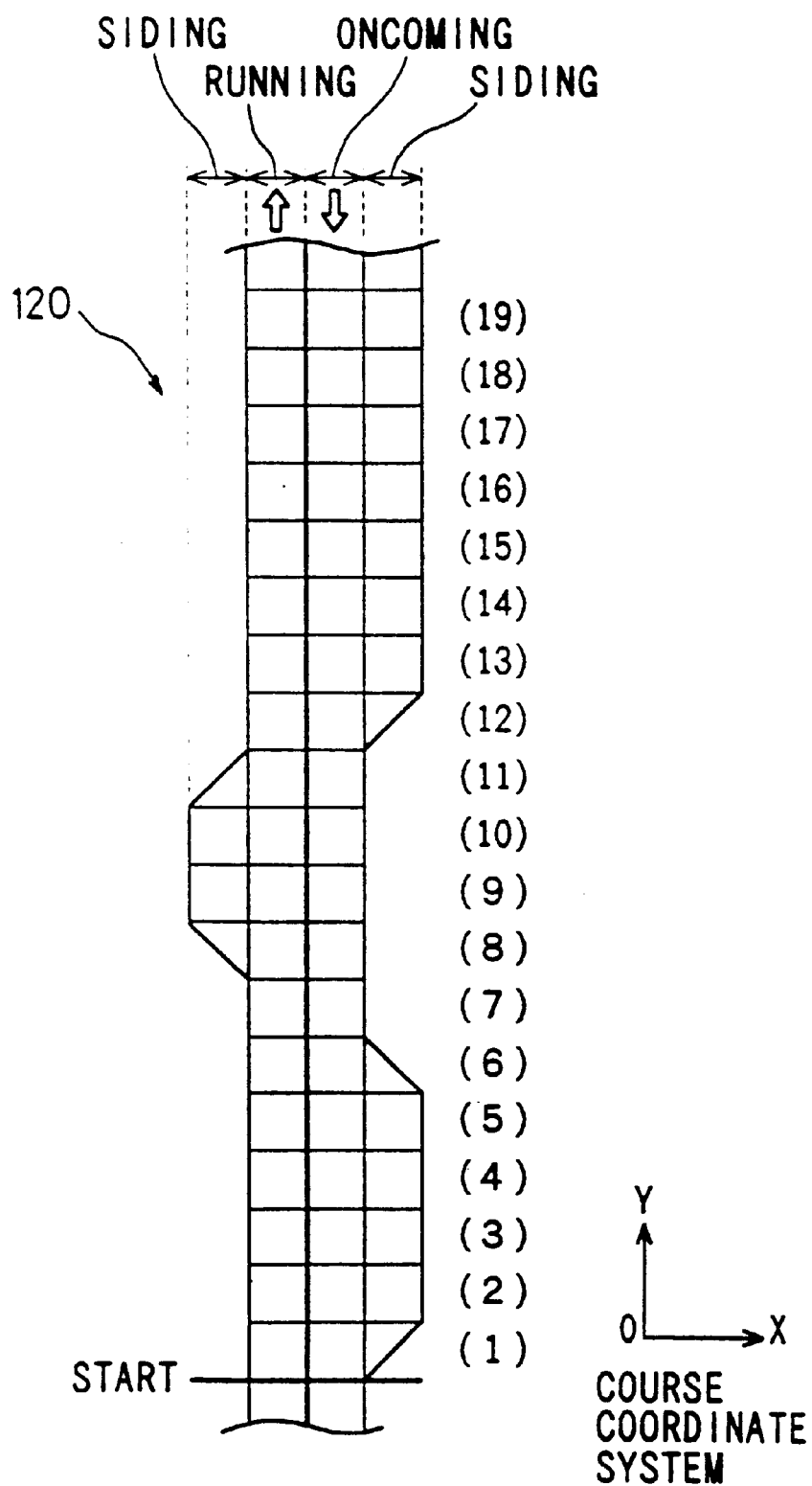
FIG. 4 is a diagram showing a hypothetical straight road that is converted from the circuit road along a center line thereof.

FIG. 4 illustrates a hypothetical straight road 120 that is converted from the circuit road 12 along a center line thereof. A two-dimensional course coordinate system (x, y) shown in FIG. 4 is established on the straight road 120. The two-dimensional course coordinate system (x, y) has y coordinates which represent distances along the straight road 120 from the start point, and x coordinates which represent transverse positions across the straight road 120.

Figure 3:
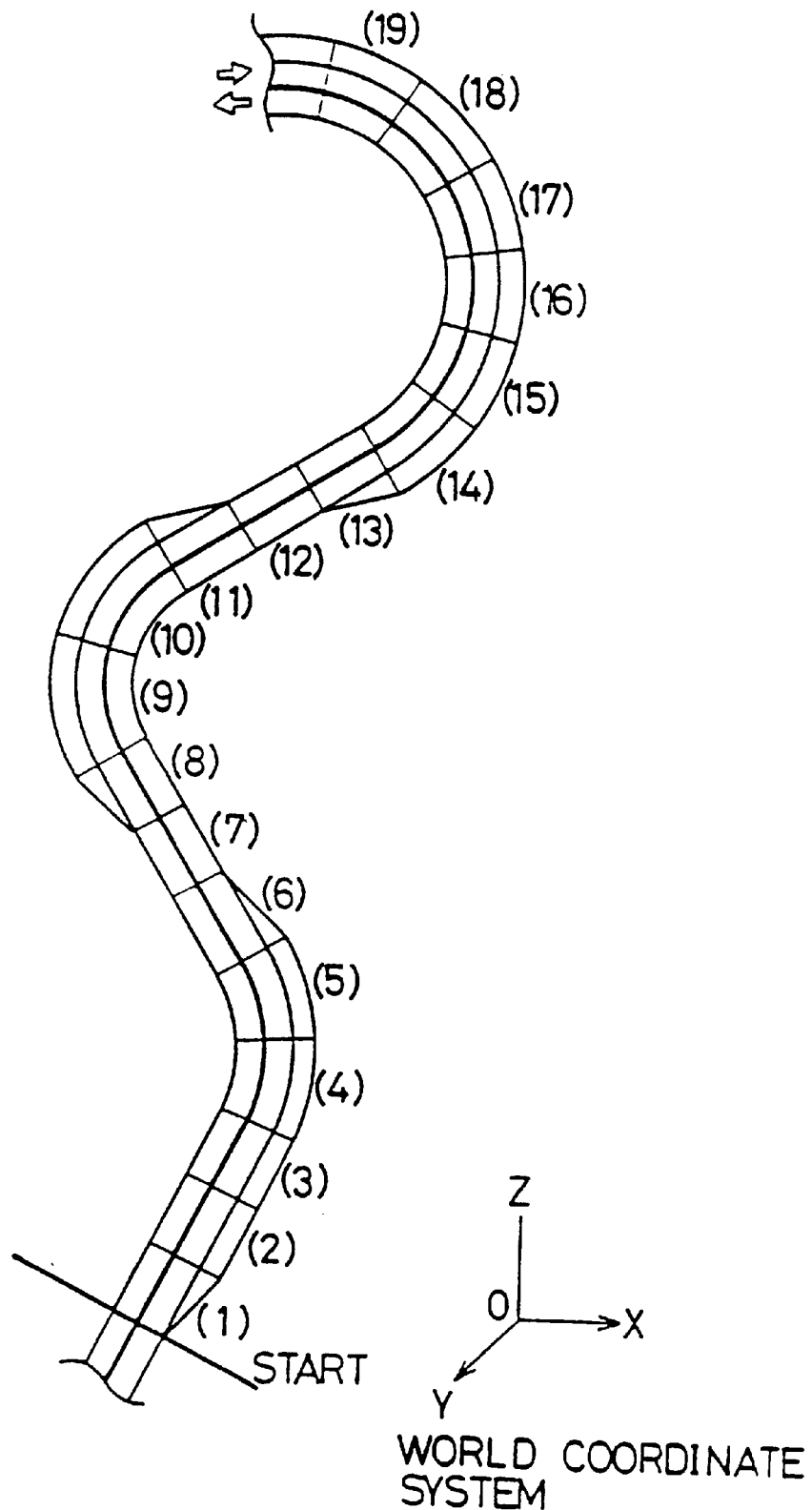
FIG. 3 is a diagram showing a portion of a circuit road which is divided into road models.

As shown in FIGS. 3 and 4, the straight road 120, i.e., the circuit road 12, has two lanes, i.e., a running lane and an oncoming lane. Some of the road models of the circuit road 12 have a siding lane outside of the running lane or the oncoming lane. Specifically, each of the road models (1), . . . , (6) and the road models (13), . . . , (19), . . . has a siding lane outside of the oncoming lane, and each of the road models (8), . . . , (11) has a siding lane outside of the running lane.

As shown in FIG. 3, the siding lanes have their beginning at the respective road models (1), (8), (13) and are progressively wider at these road models in a direction away from the start point, and their end at the respective road models (6), (11) and are progressively narrower at these road models in the direction away from the start point.

In a driving game played on the driving game machine by the player sitting in the cockpit 1, the player controls the steering wheel 4, the accelerator pedal 5, the brake pedal 6, and the gear change lever 7, trying to drive the player's automobile displayed on the display monitor 2, while passing general automobiles displayed on the display monitor 2 to run on the running lane, as fast as possible on the running lane, the oncoming lane, or the siding lane of circuit road 12 without getting into collision with general automobiles running as obstacles on the running lane and the oncoming lane. The general automobiles running on the running lane and the oncoming lane of the circuit road 12 are controlled to run along the centers of the lanes by the driving game machine. There are several tens of general automobiles established by the driving game machine. Depending on the position and direction of the player's automobile, the models of buildings and other objects along the circuit road 12 and the general automobiles, which are positioned within a visible range of the cockpit 1, are displayed on the display monitor 2.

Since the circuit road 12 of the driving game played on the driving game machine includes the oncoming lane on which general automobiles run and allows the player's automobile to run on the oncoming lane as well as on the running lane, the player can greatly be thrilled and feel realistic by driving the player's automobile while avoiding general automobiles on the coming lane.

The circuit road 12 also includes the siding lane on which the player's automobile can run. Therefore, the player can drive the player's automobile at high speeds using the siding lane. Inasmuch as the player is psychologically forced to return the player's automobile from the siding lane to the running lane or the oncoming lane until the end of the siding lane is reached, the player will find the driving game complex and full of fun.

Figure 5:
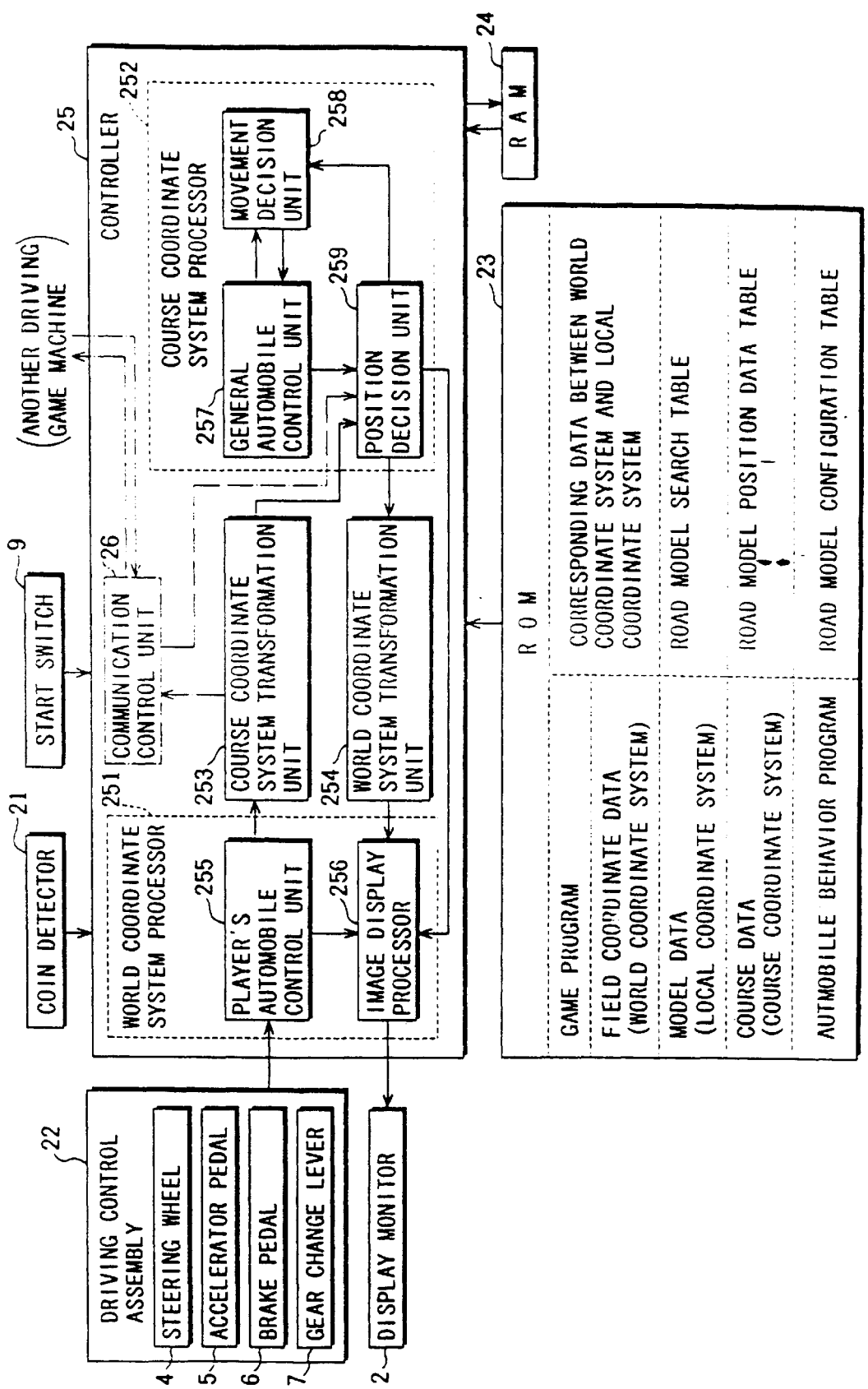
FIG. 5 is a block diagram of a control system of the driving game machine.

FIG. 5 shows in block form a control system of the driving game machine according to the present invention.

As shown in FIG. 5, the control system basically comprises the display monitor 2, the start switch 9, a coin detector 21, a driving control assembly 22, a ROM (read-only memory) 23, a RAM (random-access memory) 24, and a controller 25.

When the start switch 9 is pressed by the player, the start switch 9 issues a switch signal to the controller 25. When the coin detector 21 detects a coin inserted through the coin insertion slot 8 (see FIG. 1), it outputs a coin-detected signal to the controller 25.

The driving control assembly 22 comprises the steering wheel 4, the accelerator pedal 5, the brake pedal 6, and the gear change lever 7. The driving control assembly 22 supplies various control data, representing an angular displacement of the steering wheel 4, depths to which the accelerator pedal 5 and the brake pedal 6 are depressed, and a gear position selected by the gear change lever 7, to the controller 25 where they are inputted to a player's automobile control unit 255 (described later on).

The ROM 23 stores a program of the driving game, coordinate data of the field in the world coordinate system (X, Y, Z), coordinate data of the models in the local coordinate system (x, y, z), course data in the course coordinate system (x, y), a program relative to automobile behaviors according to the automobile engineering, data indicative of the correspondence between the world coordinate system (X, Y, Z) and the local coordinate system (x, y, z), and table data shown in Tables 1 through 3, described below. The RAM 24 serves to temporarily store various data.

The controller 25 comprises a CPU (central processing unit), logic circuits, and other circuit elements for controlling operation of the driving game machine. The controller 25 determines whether a coin is inserted into the coin insertion slot 8 or not based on the signal from the coin detector 21, and also determines whether the start switch 9 is pressed by the player or not based on the signal from the start switch 9.

The controller 25 has a world coordinate system processor 251, a course coordinate system processor 252, a course coordinate system transformation unit 253, and a world coordinate system transformation unit 254.

The world coordinate system processor 251, which carries out control in the world coordinate system (X, Y, Z), has a player's automobile control unit 255 and an image display processor 256. The course coordinate system processor 252, which carries out control in the local coordinate system (x, y, z), has a general automobile control unit 257, a movement decision unit 258, and a position decision unit 259.

The player's automobile control unit 255 controls the running of the player's automobile based on the various control data supplied from the driving control assembly 22 according to the program, stored in the ROM 23, relative to automobile behaviors according to the automobile engineering. The course coordinate system transformation unit 253 transforms the coordinate data relative to the position of the player's automobile that is being controlled in the world coordinate system (X, Y, Z) into coordinate data in the course coordinate system (x, y).

The general automobile control unit 257 controls the running of general automobiles on the straight road 120 (see FIG. 4) in the course coordinate system (x, y) under preset conditions with respect to speeds, lane change frequencies, etc. The general automobile control unit 257 controls general automobiles to run along the centers of the lanes.

The general automobile control unit 257 controls general automobiles within a preset range over a distance L forward and backward of the player's automobile. The general automobile control unit 257 compares the number "n" of general automobiles, which varies depending on the running of the player's automobile, and a predetermined value "N", and introduces a new general automobile into the above preset range if n<N. The general automobile control unit 257 determines a lane into which to introduce a new general automobile in order to have the ratio r=n2/n1 approach a predetermined value "R" where n1 is the number of general automobiles on the running lane and n2 is the number of general automobiles on the oncoming lane. Specifically, the general automobile control unit 257 introduces a new general automobile into the running lane if r≧R and into the oncoming lane if r<R.

Since y coordinates in the course coordinate system (x, y) represent distances traveled by the general automobiles along the straight load 120, the general automobile control unit 257 can easily determine the positions of the general automobiles on the running lane by adding the product of (sampling interval) x (running speed) to the present y coordinates, and the positions of the general automobiles on the oncoming lane by subtracting the product of (sampling interval) x (running speed) from the present y coordinates.

The position decision unit 259 determines the positional relation between the player's automobile and the general automobiles for a contact, a collision, etc., the positional relation between the general automobiles, and the positional relation between the player's automobile and a rod end, and also determines general automobiles which are positioned in a predetermined visible range of the player's automobile. The position decision unit 259 uses the coordinate data transformed by the course coordinate system transformation unit 253 as the positional coordinate data of the player's automobile. The predetermined visible range of the player's automobile has been defined by left and right angles with respect to the direction in which the player's automobile travels, and a distance from the player's automobile.

When the position decision unit 259 determines a contact or collision between the player's automobile and a general automobile or between the player's automobile and a road end, it delivers a collision signal to the image display processor 256.

Figure 6:
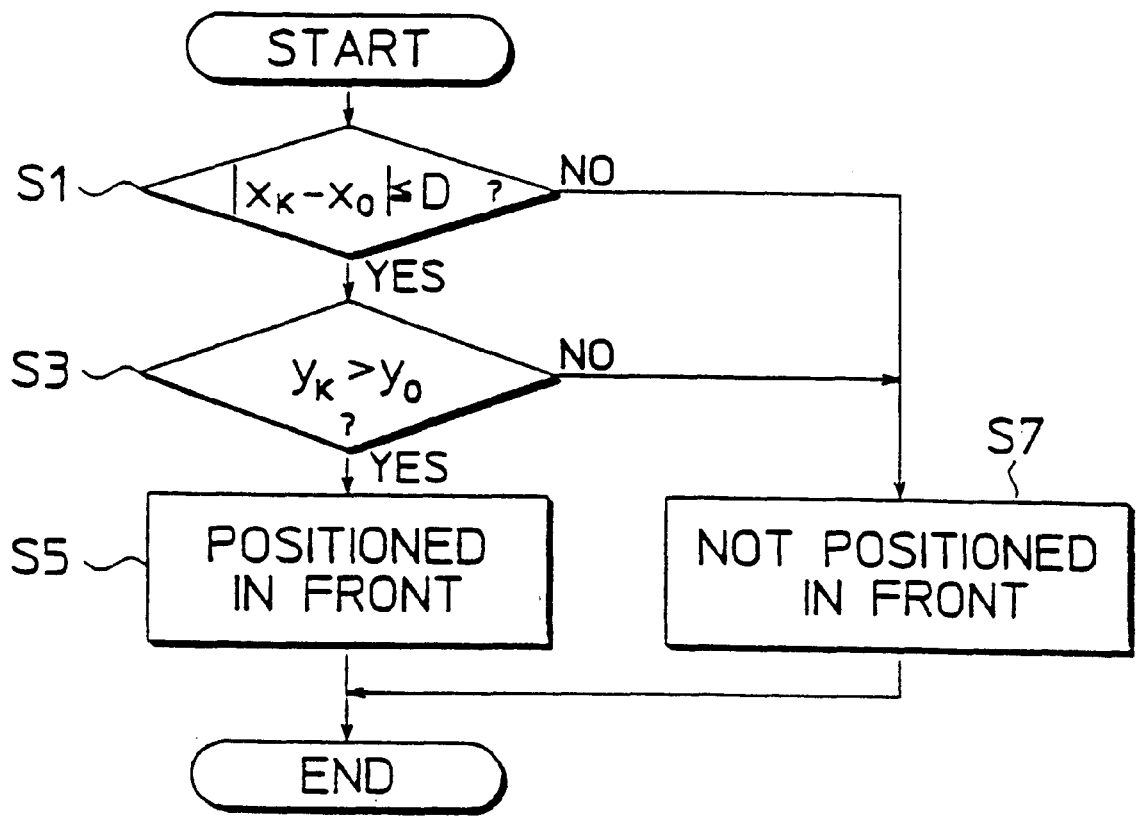
FIG. 6 is a flowchart of a sequence of making a movement decision.

The movement decision unit 258 determines whether the player's automobile or another general automobile exists in front of a general automobile which is under consideration for a movement decision, according to a process shown in FIG. 6, using the positional relation determined between the player's automobile and the general automobiles and also the positional relation between the general automobiles by the position decision unit 259. The results determined by the movement decision unit 258 are used by the general automobile control unit 257 to control the running of the general automobiles.

The world coordinate system transformation unit 254 transforms the positional coordinate data of general automobiles that are determined to be positioned in the visible range of the player's automobile by the position decision unit 259, from the course coordinate system (x, y) into the world coordinate system (X, Y, Z), according to a positional data transformation process, described later on, shown in FIG. 9.

The image display processor 256 displays the circuit road 12 (see FIG. 2) in the visible range of the player's automobile, the models of the buildings and other objects along the circuit road 12, and the general automobiles whose positional coordinate data have been transformed into the world coordinate system (X, Y, Z), on the display monitor 2 according to known three-dimensional image processing techniques including geometry and rendering processes, depending on the position and direction of the player's automobile which is controlled by the player's automobile control unit 255. When a collision signal is supplied from the position decision unit 259, the image display processor 256 displays a spinning or vibrating image on the display monitor 2.

Inasmuch as the position decision unit 259 determines the positional relation between the player's automobile and the general automobiles, the positional relation between the general automobiles, and the positional relation between the player's automobile and a road end, and also determines general automobiles which are positioned in the visible range of the player's automobile in the two-dimensional course coordinate system (x, y), the position decision unit 259 can easily and quickly determine those positional relations and general automobiles positioned in the visible range of the player's automobile. Although the width of the road on which automobiles can run varies due to the siding lanes, whether the player's automobile has contacted or collided with a road end or not can quickly and easily be determined as such a determination is made simply by comparing x coordinates in the two-dimensional course coordinate system (x, y). Therefore, a siding layer can be established in any arbitrary position, making the driving game interesting to the player.

The general automobiles are controlled by the course coordinate system processor 252, and the positional coordinate data of only those general automobiles which are displayed on the display monitor 2 are transformed from the two-dimensional course coordinate system (x, y) into the three-dimensional world coordinate system (X, Y, Z). Therefore, the number of general automobiles that can be con- trolled can be increased without increasing the burden on the CPU of the controller 25. General automobiles on the oncoming lane which run in the opposite direction can easily be controlled. The increased number of general automobiles makes the driving game more interesting to the player, and also gives a more realistic look to three-dimensional images displayed on the display monitor 2.

A process of making a movement decision with the movement decision unit 258 will be described below with reference to FIG. 6.

It is assumed that an automobile which is under consideration for a movement decision has coordinates (x0, y0) in the course coordinate system (x, y), an automobile k which is not under consideration for a movement decision have coordinates (xk, yk) in the course coordinate system (x, y), and each lane of the straight road 120 has a width D, where k is an integer ranging from 1~m, and that there are m general and player's automobiles which are not under consideration for a movement decision.

As shown in FIG. 6, the movement decision unit 258 determines whether or not the difference xk−x0 between the coordinates xk, x0 is equal to or smaller than the width D in a step S1. If the difference xk−x0 is equal to or smaller than the width D (YES in the step S1), then the movement decision unit 258 determines whether or not the coordinate yk are greater than the coordinate y0 in a step S3. If the coordinate yk are greater than the coordinate y0 (YES in the step S3), then the movement decision unit 258 decides that the automobile k is positioned in front of the automobile which is under consideration for a movement decision in a step S5.

If the difference xk−x0 is greater than the width D (NO in the step S1), then the automobile k is not positioned in the same lane as the automobile which is under consideration for a movement decision. If the coordinate yk are smaller than the coordinate y0 (NO in the step S3), then the automobile k is not positioned in front of the automobile which is under consideration for a movement decision. In either case, the movement decision unit 258 decides that the automobile k is not positioned in front of the automobile which is under consideration for a movement decision in a step S7.

The above process is effected on other automobiles k (1~m) than the automobile which is under consideration for a movement decision, so that all automobiles positions in front of the automobile which is under consideration for a movement decision can be ascertained.

Heretofore, the above process of making a movement decision is the most complex, and contains the largest number of processing steps, of all processes that make up the computerized control of the driving game. For driving a general automobile on the display monitor 2 under preset conditions with respect to a speed, etc., it is necessary to determine whether another automobile exists in front of the general automobile or not according to the above process of making a movement decision. If the positions of the automobiles were calculated using three-dimensional coordinate data and the positional relationship between the automobiles were determined and the above process of making a movement decision were carried out using the calculated positions for displaying a three-dimensional image, then the program of the driving game would be complex and contain a large number of processing steps.

However, according to the present invention, since the two-dimensional coordinate data in the course coordinate system are used by the movement decision unit 258, the above process of making a movement decision can be carried out easily as shown in FIG. 6. This allows many general automobiles, e.g., several tens of general automobiles, to be used in the driving game, making the driving game more fun to play than heretofore.

Operation of the driving game machine according to the present invention will be described below with reference to FIGS. 7 through 9.

Figure 7:
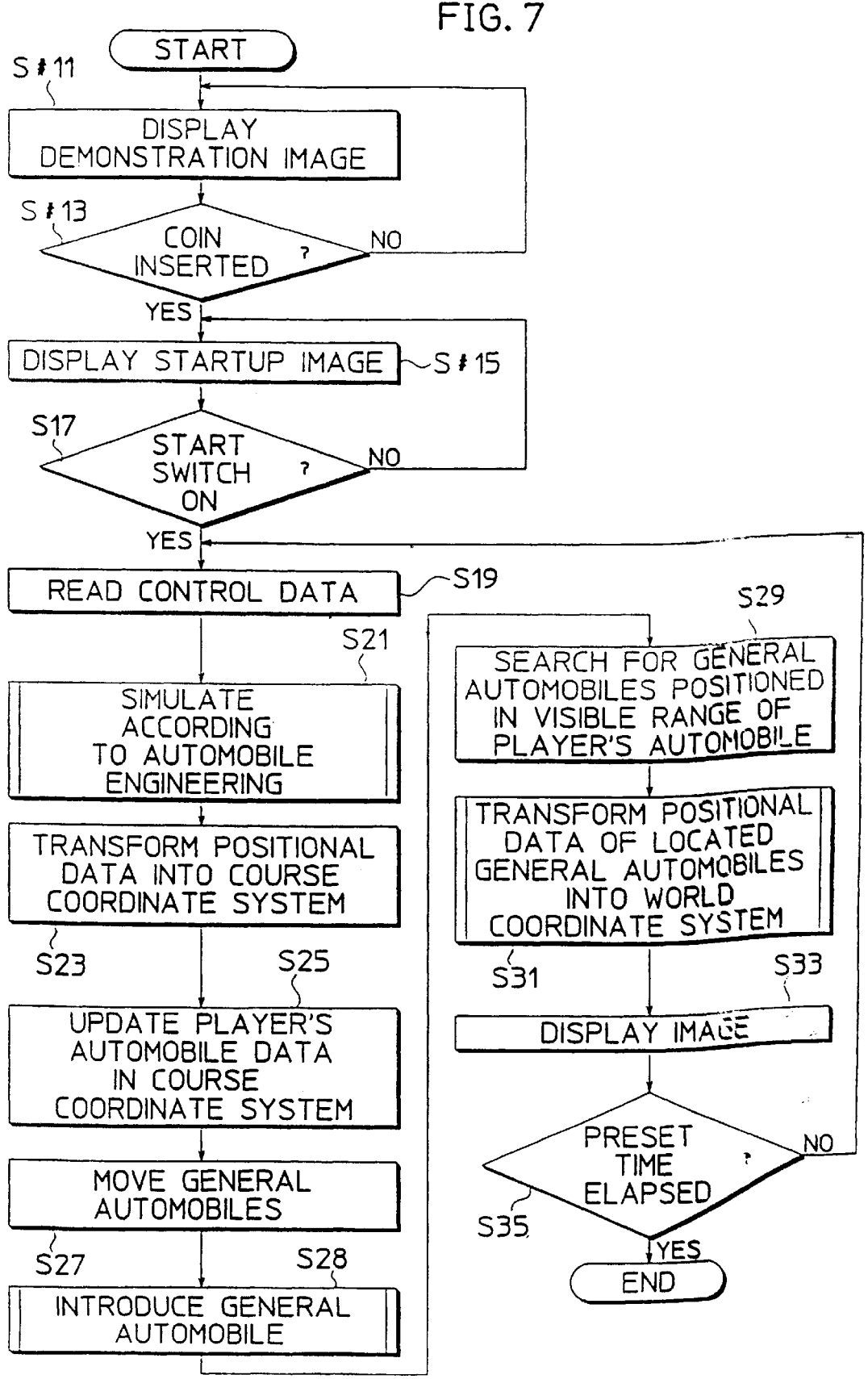
FIG. 7 is a flowchart of an operation sequence of the driving game machine.

As shown in FIG. 7, when the driving game machine is switched on, the image display processor 256 displays a demonstration image on the display monitor 2 in a step S11. Then, the controller 25 determines whether a coin is inserted into the coin insertion slot 8 or not in a step S13. If not inserted (NO in the step S13), then the image display processor 256 continuously displays the demonstration image on the display monitor 2. If inserted (YES in the step S13), then the image display processor 256 displays a startup image on the display monitor 2 in a step S15.

Then, the controller 25 determines whether the start switch 9 is pressed or not in a step S17. If not pressed (NO in the step 17), then the image display processor 256 continuously displays the startup image on the display monitor 2. If pressed (YES in the step S17), then the driving game is initiated, and the player operates the steering wheel 4, the accelerator pedal 5, the brake pedal 6, and the gear change lever 7 of the driving control assembly 22 to drive the player's automobile.

Various control data outputted from the driving control assembly 22 are supplied to the player's automobile control unit 255 in a step S19. The player's automobile control unit 255 effects a simulation process of simulating the player's automobile based on the automobile engineering according to the automobile behavior program stored in the ROM 23 in a step S21. Positional coordinate data of the player's automobile are produced by the player's automobile control unit 255 in the simulation process, and supplied to the course coordinate system transformation unit 253, which transforms the positional coordinate data into positional coordinate data in the course coordinate system (x, y) in a step S23.

Then, the positional data of the player's automobile in the position decision unit 259 are updated in a step S25. The general automobile control unit 257 effects a process of moving the general automobiles depending on the result determined by the movement decision unit 258 in a step S27. Then, the general automobile control unit 257 carries out a general automobile introduction process according to a subroutine described later on in a step S28.

Thereafter, the position decision unit 259 ascertains general automobiles that are positioned in the visible range of the player's automobile in a step S29. The world coordinate system transformation unit 254 transforms the positional coordinate data of the ascertained general automobiles from the course coordinate system (x, y) into the world coordinate system (X, Y, Z) according to a positional data conversion subroutine described later on in a step S31.

Then, the image display processor 256 effects a three-dimensional image process on the positional coordinate data of the general automobiles which have been converted into the world coordinate system (X, Y, Z) and also the data about the position and direction of the player's automobile which have been produced in the simulation process, and displays the player's automobile and the general automobiles on the display monitor 2 in a step S33. Then, the controller 25 determines whether a preset period of time has elapsed from the start of the driving game or not in a step S35. If not elapsed (NO in the step S35), then control returns to the step S19 to carry out the steps S19 through S35 to repeat the above running control process. If elapsed (YES in the step S35), then control comes to an end.

The driving game may be started when a coin is inserted through the coin insertion slot 8 rather than when the start switch 9 is pressed. The driving game may be finished when the player's automobile has run a predetermined number of laps around the circuit road 12 rather than when preset period of time has not elapsed.

Figure 8:
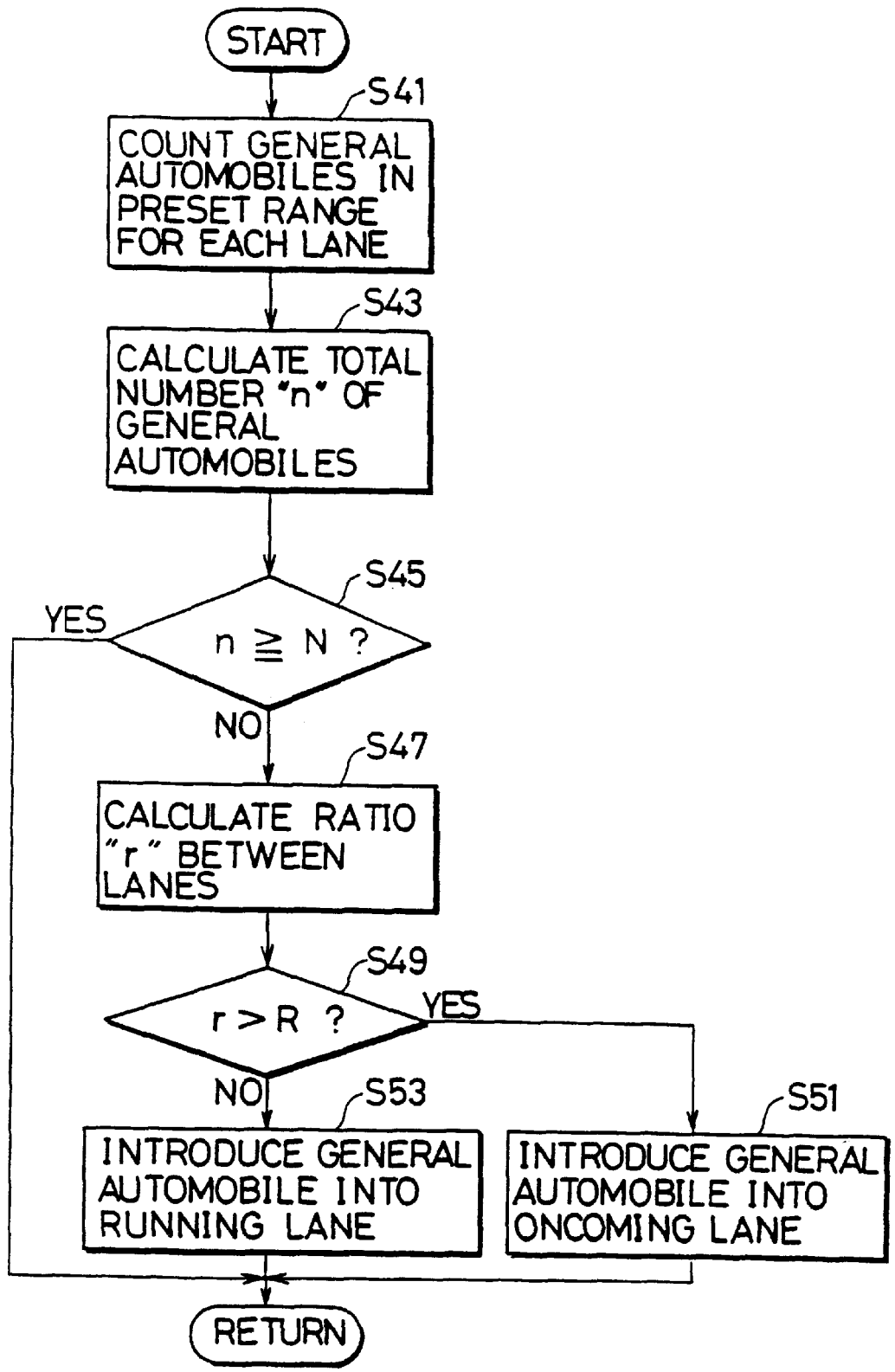
FIG. 8 is a flowchart of a general automobile introduction subroutine in the operation sequence shown in FIG. 7.

FIG. 8 shows the subroutine of the general automobile introduction process in the step S28 of the operation sequence shown in FIG. 7.

At the time the process of moving the general automobiles in the step S27 is finished, general automobiles which are present in the range over the distance L forward and backward of the player's automobile are counted on each of the lanes in a step S41. It is assumed here that the number of such automobiles present on the running lane is n1, and the number of such automobiles present on the oncoming lane is n2.

Then, the total number $(n=n_1+n_2)$ of general automobiles is calculated in a step S43. A next step S45 determines whether or not the total number "n" is equal to or greater than the predetermined value "N" (n≧N). If n≧N (YES in the step S45), then the subroutine shown in FIG. 8 comes to an end.

If n<N (NO in the step S45), then the ratio r=n2/n1 between the numbers of automobiles on the lanes is calculated in a step S47. Thereafter, a step S49 determines whether the ratio "r" is larger than predetermined value "R" or not.

If r>R (YES in the step S49), then a new general automobile is introduced into the oncoming lane at a position corresponding to the distance L forward of the player's automobile in a step S51. If r≦R (NO in the step S49), then a new general automobile is introduced into the running lane at a position corresponding to the distance L backward of the player's automobile in a step S53.

Since the number "n" of general automobiles present in the range over the distance L forward and backward of the player's automobile is compared with the predetermined value "N" to control the introduction of a new general automobile, as described above, such a new general automobile is introduced when the player's automobile has passed a certain number of general automobiles, and the frequency of introduction of a new general automobile is maintained at the same level at all times from the beginning to the end of the driving game.

FIG. 9 shows the positional data transformation ;subroutine in the step S31 in greater detail.

First, as shown in FIG. 9, the world coordinate system transformation unit 254 refers to a road model search table 1, partly shown below, to search for a road model in which a general automobile is positioned, from the coordinate data of the general automobile in the course coordinate system (x, y) in a step S61.

TABLE 1

Road Model Search

| Distance (m) | Road model |
|---|---|
| 0~100 | (1) |
| 100~200 | (2) |
| 200~300 | (3) |
| 300~400 | (4) |
| 400~500 | (5) |
| 500~600 | (6) |
| 600~700 | (7) |
| 700~800 | (8) |

The road model search table 1, which is partly shown above, is stored in the ROM 23, and represents the association between the distance-related groups of the y coordinates of the straight road 120 in the course coordinate system (x, y) and the road models of the straight road 120.

Thereafter, in a step S63, the world coordinate system transformation unit 254 refers to a road model position data table 2, partly shown below, to search for coordinate data in the world coordinate system (X, Y, Z) which correspond to the origin of the local coordinate system (x, y, z) that describes the road model obtained in the step S61.

TABLE 2

Road Model Position Data

| Road Model | Position in world coordinate system |
|---|---|
| (1) | (X1, Y1, Z1) |
| (2) | (X2, Y2, Z2) |
| (3) | (X3, Y3, Z3) |
| (4) | (X4, Y4, Z4) |
| (5) | (X5, Y5, Z5) |
| (6) | (X6, Y6, Z6) |
| (7) | (X7, Y7, Z7) |
| (8) | (X8, Y8, Z8) |

The road model position data table 2, which is partly shown above, is stored in the ROM 23, and represents the positional relation between the local coordinate system (x, y, z) which describes the configuration information of each of the road models and the world coordinate system (X, Y, Z).

Then, in a step S65, the world coordinate system transformation unit 254 refers to a road model configuration table 3, partly shown below, to search for configuration information of the road model obtained in the step S61.

TABLE 3

Road Model Configuration

Road Configuration Information

| Road Model | Lane | Shape | Center of Curvature | Radius of Curvature (m) | Siding Lane |
|---|---|---|---|---|---|
| (1) | 2->3 | Straight | — | — | Starting at oncoming lane |
| (2) | 3 | Straight | — | — | At oncoming lane |
| (3) | 3 | Straight | — | — | At oncoming lane |
| (4) | 3 | Left Curve | $(x_4, y_4, z_4)$ | $r_4$ | At oncoming lane |
| (5) | 3 | Left Curve | $(x_4, y_4, z_4)$ | $r_4$ | At oncoming lane |
| (6) | 2->3 | Straight | — | — | Ending at oncoming lane |
| (7) | 2 | Straight | — | — | — |
| (8) | 2->3 | Straight | — | — | Starting at oncoming lane |

The road model shape table 3, which is partly shown above, is stored in the ROM 23, and represents the information with respect to the configuration of each of the road models.

The information with respect to the configuration of each of the road models includes the number of lanes, the shape, i.e., straight, left curve, or right curve, and additionally the center and radius of curvature for left and right curves in the local coordinate system (x, y, z).

If a road model has a siding lane, then the road model shape table 3 further includes information as to whether the siding lane starts or ends or whether the siding lane is at the running lane or the oncoming lane. This information may be replaced with data with respect to the width of the road model, which provide data of a road end.

Then, in a step S67, the world coordinate system transformation unit 254 calculates coordinate data of the automobile in the local coordinate system (x, y, z) of the road model from the coordinate data of the automobile in the course coordinate system (x, y) and the configuration information obtained in the step S65.

Finally, in a step S69, the world coordinate system transformation unit 254 calculates coordinate data of the automobile in the world coordinate system (X, Y, Z) from the coordinate data of the road model in the world coordinate system (X, Y, Z), which have been obtained in the step S63, and the coordinate data of the automobile in the local coordinate system (x, y, z).

Two players can compete with each other in a driving game which is played using two driving game machines each identical to the driving game machine shown in FIG. 5.

The two driving game machines are connected to each other by a communication cable. To allow the two driving game machines to communicate with each other, the controller 25 of each of the driving game machines additionally has a communication control unit 26 which is indicated by the dot-and-dash lines in FIG. 5.

The communication control unit 26 in the controller 25 of one of the driving game machines transmits the coordinate data of the position of the player's automobile to the other driving game machine, and receives the player's automobile controlled by the other driving game machine, i.e., the coordinate data in the course coordinate system (x, y) of the rival automobile controlled by the other driving game machine, and sends the received coordinate data to the position decision unit 259.

The position decision unit 259 determines the positional relation between the player's automobile and the rival automobile and also the positional relation between the general automobiles and the rival automobile, and further determines the rival automobile which is positioned in the preset visible range of the player's automobile. When the position decision unit 259 determines a contact or collision between the player's automobile and the rival automobile, it delivers a collision signal to the image display processor 256.

The movement decision unit 258 determines whether the rival automobile exists in front of the same lane as the player's automobile or not. When the position decision unit 259 determines that the rival automobile is positioned in the visible range of the player's automobile, the world coordinate system transformation unit 254 transforms the positional coordinate data of the rival automobile from the course coordinate system (x, y) into the world coordinate system (X, Y, Z). The image display processor 256 displays the rival automobile whose positional coordinate data have been transformed into the world coordinate system (X, Y, Z) on the display monitor 2.

As described above, the communication control units 26 in the controllers 25 of the two driving game machines exchange the positional data of the player's automobiles controlled by the respective driving game machines. Therefore, the players of the two driving game machines can compete with each other in a driving game jointly played on the driving game machines, and will find the driving game much more interesting.

Because the positional data of the rival automobile are handled as the two-dimensional coordinate data in the course coordinate system (x, y), the position decision unit 259 can easily and quickly determine the positional relations and the rival automobile in the visible range of the player's automobile.

Various changes or modifications may be made in the illustrated embodiment of the driving game machine according to the present invention as follows:

(1) The communication control unit 26 may transmit the positional coordinate data of the player's automobile in the world coordinate system (X, Y, Z) which have been obtained by the player's automobile control unit 255, and also receive the positional coordinate data of the player's automobile in the world coordinate system (X, Y, Z) which is controlled by another driving game machine. In such a modification, the course coordinate system transformation unit 253 transforms the received positional coordinate data into the course coordinate system (x, y), and then delivers the transformed positional coordinate data to the position decision unit 259.

(2) The interconnected driving game machines may be dispensed with their own individual controllers 25, but may be controlled by a single controller 25 in a centralized control system that governs all the driving game machines. In this modified arrangement, the single controller 25 does not need any communication control unit 26, but has course coordinate system processors 252 associated respectively with the driving game machines. The single controller 25 also has the course coordinate system processor 252, the course coordinate system transformation unit 253, and the world coordinate system transformation unit 254 for carrying out the same decision and transformation processes as described above.

(3) Three or more driving game machines may be interconnected through their respective communication control units 26. In such a modification, the positional data of rival automobiles are handled as coordinate data in the two-dimensional course coordinate system (x, y), so that the position decision unit 259 can easily and quickly determine the positional relations and the rival automobiles in the visible range of the player's automobile. Therefore, the number of rival automobiles involved in a driving game played jointly on the driving game machines increases to the point where the players will be excited by the driving game as they compete with many other rival automobiles simultaneously all the way during the driving game.

(4) The communication control unit 26 may be replaced with a rival automobile control unit for controlling the running of a rival automobile with preset capabilities, and the driving game machine may not be connected to another driving game machine. According to this modification, the player of the driving game machine can compete with a rival automobile all by himself, and can still enjoy a competitive driving game.

(5) In transforming the positional coordinate data of general automobiles in the subroutine shown in FIG. 9, at a curve of the circuit road 12, an automobile running on an inner lane along the curve may slightly be decelerated, and an automobile running on an outer lane along the curve may slightly be accelerated, for thereby compensating for the difference between speeds on the straight road 120 and the circuit road 12.

(6) In FIG. 3, the circuit road 12 may be divided into longer road models in a straight section thereof and shorter road models in a curve section thereof, so that these road models may have different distances or lengths. In this manner, the number of road models of the circuit road 12 may be reduced.

(7) The predetermined value "N" used in the general automobile control unit 257 may be variable to adjust the level of difficulty of the driving game. Specifically, a switch for adjusting the level of difficulty of the driving game may be positioned near the cockpit 1, and the general automobile control unit 257 may adjust the predetermined value "N" in response to an input signal from the switch for adjusting the level of difficulty of the driving game. Since the player can select a level of difficulty of the driving game with the switch, different players having different abilities can enjoy the driving game depending on their abilities.

(8) The driving game machine may have an initial setting display control means for displaying on the display monitor 2 an initial setting image for the player to select either a left-side lane or a right-side lane for use as the running lane, and a memory means for storing the lane which has been selected by the player. The player's automobile control unit 255 may determine a lane position according to the selected lane when a running lane for the player's automobile is to be determined, and the general automobile control unit 257 may switch between x coordinates of the course coordinate system depending on the lane that has been selected to introduce a general automobile.

Specifically, the game program stored in the ROM 23 may include the step of displaying an initial setting image on the display monitor 2 when the driving game machine is turned on while the start switch 9 is being pressed, the step of selecting either a left-side lane or a right-side lane for the running lane in the displayed initial setting image, the step of setting a lane flag depending on the selected lane, the step of determining a lane position or x coordinates of the course coordinate system by referring to the lane flag when a running lane for the player's automobile is to be determined, and the step of switching between x coordinates of the course coordinate system by referring to the lane flag when a general automobile is to be introduced.

In this manner, even when the driving game machine is used in various countries with different legal requirements for automobiles to keep to left- and right-side lanes, the driving game machine allows the player to select either a left-side lane or a right-side lane for the running lane without rewriting the game program.

(9) The circuit road 12 may be divided into a plurality of blocks, data of the world coordinate system as to the width of the circuit road 12 for each of the blocks may be stored in the ROM 23, and a collision between the player's automobile and a road end may be determined for each of the blocks by the player's automobile control unit 255 of the world coordinate system processor 251, rather than the position decision unit 259 of the course coordinate system processor 252. When the player's automobile control unit 255 decides that such a collision has occurred, the player's automobile control unit 255 may send a collision signal to the image display processor 256. Accordingly, a collision can easily be determined with respect to any road widths simply by storing road width data of the respective blocks into the ROM 23.

(10) As shown in FIG. 3, the circuit road 12 basically comprises two lanes, i.e., a running lane and an oncoming lane, except for siding lanes. Either one or both of the running and oncoming lanes may comprise a plurality of lanes to make the driving game more complex and interesting.

(11) The circuit road 12 may have a predetermined no-passing zone indicated along the center line thereof, and the player's automobile may be controlled without limitations. This allows the player to drive the player's automobile under nearly actual conditions to the circuit road 12, and to feel realistic in driving the player's automobile. In addition to the no-passing zone, the player's automobile control unit 255 or the position decision unit 259 may inhibit the player's automobile from changing lanes. As a result, the driving game is made more complex and interesting.

(12) The general automobile control unit 257 may have a processor for calculating the speed of travel of the player's automobile when r≦R in the step S29 shown in FIG. 8, and a comparator for comparing the calculated speed with a preset speed for a new general automobile to be introduced next. If the calculated speed is higher than the preset speed, then the general automobile control unit 257 may introduce a new general automobile into the running lane at a position corresponding to the distance L forward of the player's automobile. If the calculated speed is lower than the preset speed, then the general automobile control unit 257 may introduce a new general automobile into the running lane at a position corresponding to the distance L backward of the player's automobile.

(13) The ROM 23 may be in the form of a removable computer-readable medium such as a CD-ROM, an optical disk, a memory card, a floppy disk, or the like for replacing or updating the game program.

Although a certain preferred embodiment of the present invention has been shown and described in detail, it should be understood that various changes and modifications may be made therein without departing from the scope of the appended claims.

What is claimed is:

1. A driving game machine comprising:

image display processing means for displaying a real-time three-dimensional image including a simulated player's automobile, general automobiles, and a three-dimensional road established in a game space in a three-dimensional coordinate system on a display monitor, said three-dimensional road having a running lane and an oncoming lane for the player's and general automobiles to run therealong;

driving control means operable by a player for entering instructions pertaining to the player's automobile; and player's automobile control means for controlling the player's automobile to run on the three-dimensional road in response to the instructions from said driving control means;

said image display processing means comprising means for displaying general automobiles on the running lane and the oncoming lane within a visible range of the player's automobile.

2. A driving game machine according to claim 1, wherein said image display processing means comprises means for displaying general automobiles to run in the running lane in the same direction as said player's automobile and general automobiles to run in the oncoming lane in a direction opposite to said player's automobile.

3. A driving game machine according to claim 1 or 2, further comprising:

three-dimensional data memory means for storing coordinate data of said three-dimensional road;

two-dimensional data memory means for storing coordinate data of a straight road established in a two-dimensional coordinate system in association with said three-dimensional road, said straight road having a running lane and an oncoming lane for the player's and general automobiles to run therealong;

general automobile control means for controlling general automobiles on the running and oncoming lanes of said straight road;

two-dimensional coordinate transforming means for transforming coordinate data of said player's automobile on said three-dimensional road into coordinate data on said straight road in said two-dimensional coordinate system;

position deciding means for determining general automobiles positioned in the visible range of the player's automobile based on the coordinate data on said straight road in said two-dimensional coordinate system; and three-dimensional coordinate transforming means for transforming coordinate data of said general automobiles which are determined as being positioned in said visible range into coordinate data on said three-dimensional road in said three-dimensional coordinate system.

4. A driving game machine according to claim 3, further comprising:

lane selecting means for selecting a left-side lane or a right-side lane for use in the three-dimensional road; and coordinate switching means for switching between coordinate data of the running and oncoming lanes transversely across the straight road, which are stored in said two-dimensional data memory means, depending on the selected left-side or right-side lane.

5. A driving game machine according to claim 3, further comprising:

counting means for counting general automobiles positioned within a predetermined range from the player's automobile based on the coordinate data on said straight road in the two-dimensional coordinate system;

said general automobile control means comprising means for introducing a new general automobile into said predetermined range when the number of counted general automobiles is equal to or less than a predetermined value.

6. A driving game machine according to claim 3, further comprising:

rival automobile control means for controlling a rival automobile to run on said three-dimensional road;

said two-dimensional coordinate transforming means comprising means for transforming coordinate data of said rival automobile on said three-dimensional road into coordinate data on said straight road in said two-dimensional coordinate system;

said position deciding means comprising means for determining whether said rival automobile is positioned within said visible range based on the coordinate data on said straight road in said two-dimensional coordinate system.

7. A computer-readable medium having stored thereon a driving game program comprising computer software instructions for execution by a computer processor, the driving game program for driving a simulated player's automobile on a three-dimensional road established in a game space in a three-dimensional coordinate system as instructed by a game player, said three-dimensional road having a running lane and an oncoming lane for the player's automobile and general automobiles to run therealong, said software instructions including program code causing said computer processor to perform the step of displaying on a display monitor a real-time three-dimensional image, which includes generally automobiles on the running lane and the oncoming lane, within a visible range of the player's automobile.

8. A computer-readable medium according to claim 7, wherein said step of displaying comprises the steps of:

transforming coordinate data of the player's automobile on the three-dimensional road in the three-dimensional coordinate system into coordinate data on a straight road in a two-dimensional coordinate system;

determining a general automobile positioned in the visible range of the player's automobile based on the coordinate data on the straight road in the two-dimensional coordinate system; and transforming coordinate data of the determined general automobile into coordinate data on the three-dimensional road in the three-dimensional coordinate system.

9. A driving game machine comprising:

an image display processor which displays a real-time three-dimensional image including a simulated player's automobile, general automobiles, and a three-dimensional road established in a game space in a three-dimensional coordinate system on a display monitor, said three-dimensional road having a running lane and an oncoming lane for the player's and general automobiles to run therealong, said image display processor displaying general automobiles on the running lane and the oncoming lane within a visible range of the player's automobile;

a driving control operable by a player by which said player can enter instructions pertaining to the player's automobile; and a controller which controls running of the player's automobile on the three-dimensional road in response to the instructions from said driving control.

10. A driving game machine according to claim 9, wherein said image display processor displays general automobiles to run in the running lane in the same direction as said player's automobile and general automobiles to run in the oncoming lane in a direction opposite to said player's automobile.

11. A driving game machine according to claim 9, further comprising:

a three-dimensional data memory for storing coordinate data of said three-dimensional road;

a two-dimensional data memory for storing coordinate data of a straight road established in a two-dimensional coordinate system in association with said three-dimensional road, said straight road having a running lane and an oncoming lane for the player's and general automobiles to run therealong;

a general automobile controller which permits control of general automobiles on the running and oncoming lanes of said straight road;

two-dimensional coordinate transforming means for transforming coordinate data of said player's automobile on said three-dimensional road into coordinate data on said straight road in said two-dimensional coordinate system;

position deciding means for determining general automobiles positioned in the visible range of the player's automobile based on the coordinate data on said straight road in said two-dimensional coordinate system; and three-dimensional coordinate transforming means for transforming coordinate data of said general automobiles which are determined as being positioned in said visible range into coordinate data on said three-dimensional road in said three-dimensional coordinate system.

12. A driving game machine according to claim 11, further comprising:

a lane selector which permits selection of one of a left-side lane and a right-side lane for use in the three-dimensional road; and coordinate switching means for switching between coordinate data of the running and oncoming lanes transversely across the straight road, which are stored in said two-dimensional data memory, depending on the selected left-side or right-side lane.

13. A driving game machine according to claim 11, further comprising:

a counter for counting general automobiles positioned within a predetermined range from the player's automobile based on the coordinate data on said straight road in the two-dimensional coordinate system; and said general automobile controller introducing a new general automobile into said predetermined range when the number of counted general automobiles is equal to or less than a predetermined value.

14. A driving game machine according to claim 11, further comprising:

a rival automobile controller which permits control of a rival automobile to run on said three-dimensional road;

said two-dimensional coordinate transforming means comprising means for tranforming coordinate data of said rival automobile on said three-dimensional road into coordinate data on said straight road in said two-dimensional coordinate system;

said position deciding means comprising means for determining whether said rival automobile is positioned within said visible range based on the coordinate data on said straight road in said two-dimensional coordinate system.

* * * * *